US005623093A

United States Patent [19]

Schenkel et al.

[11] Patent Number: 5,623,093

[45] Date of Patent: Apr. 22, 1997

[54] METHOD AND APPARATUS FOR CALIBRATING AN ELECTROHYDRAULIC SYSTEM

[75] Inventors: Nathan T. Schenkel, Coal City; Rick D. Vance, Washington, both of Ill.; Peter R. Hildner, Apex, N.C.

[73] Assignee: Caterpillar Inc., Peoria, Ill.

[21] Appl. No.: 565,369

[22] Filed: Nov. 30, 1995

[51] Int. Cl.$^6$ .......... G01P 21/00

[52] U.S. Cl. .......... 73/1.01

[58] Field of Search .......... 73/1 J, 1 D, 1 R

[56] References Cited

U.S. PATENT DOCUMENTS

| | | | |
|---|---|---|---|
| 4,456,863 | 6/1984 | Matusek | 318/572 |
| 4,586,403 | 5/1986 | Lee et al. | 74/866 |
| 4,881,186 | 11/1989 | Tsuboi et al. | 364/565 |
| 4,920,305 | 4/1990 | Benson et al. | 318/657 |
| 4,931,967 | 6/1990 | Boe et al. | 364/571.01 |
| 4,980,825 | 12/1990 | Tootell et al. | 364/580 |
| 5,012,415 | 4/1991 | Boe et al. | 364/424.07 |
| 5,029,067 | 7/1991 | Nishida et al. | 364/175 |
| 5,048,293 | 9/1991 | Aoyagi | 60/420 |
| 5,164,722 | 11/1992 | Laroze et al. | 341/20 |
| 5,249,422 | 10/1993 | Smith et al. | 60/426 |
| 5,289,388 | 2/1994 | Dahroug et al. | 364/509 |
| 5,365,437 | 11/1994 | Cunningham et al. | 364/424.1 |
| 5,541,486 | 7/1996 | Zoller et al. | 318/619 |
| 5,542,251 | 8/1996 | Leibing et al. | 60/426 |

*Primary Examiner*—Thomas P. Noland
*Attorney, Agent, or Firm*—David M. Masterson

[57] ABSTRACT

In one aspect of the present invention, an apparatus and method for calibrating an electrohydraulic system is disclosed. In accordance with the present invention, a hydraulic valve that is responsive to an electrical valve signal controllably provides hydraulic fluid flow to a hydraulic actuator. A position sensor senses the position of the hydraulic actuator and responsively produces an actuator position signal. A microprocessor based controller receives the actuator position signal and determines when the hydraulic actuator begins movement, and associates the magnitude of the electrical valve signal to a first predetermined joystick position. Thereafter, the microprocessor based controller determines when the hydraulic actuator movement reaches terminal velocity and associates the magnitude of the electrical valve signal to a second predetermined joystick position.

11 Claims, 3 Drawing Sheets

METHOD AND APPARATUS FOR CALIBRATING AN ELECTROHYDRAULIC SYSTEM

TECHNICAL FIELD

This invention relates generally to a method and apparatus for calibrating an electrohydraulic system and, more particularly, to a calibration system that associates two operating points of an electrohydraulic system to two predetermined positions of a control lever.

BACKGROUND ART

Work machines such as wheel type loaders include work implements capable of being moved through a number of positions during a work cycle. Such implements typically include buckets, forks, and other material handling apparatus. The typical work cycle associated with a bucket includes sequentially positioning the bucket and associated lift arm in a digging position for filling the bucket with material, a carrying position, a raised position, and a dumping position for removing material from the bucket.

Control levers are mounted at the operator's station and are connected to a hydraulic circuit for moving the bucket and/or lift arms. The operator must manually move the control levers to open and close hydraulic valves that direct pressurized fluid to hydraulic cylinders which in turn cause the implement to move. For example, when the lift arms are to be raised, the operator moves the control lever associated with the lift arm hydraulic circuit to a position at which a hydraulic valve causes pressurized fluid to flow to the head end of a lift cylinder, thus causing the lift arms to rise. When the control lever returns to a neutral position, the hydraulic valve closes and pressurized fluid no longer flows to the lift cylinder.

In systems of the above type, the performance or characteristics of the electrohydraulic system changes over time due to wear of the electrohydraulic components. As the characteristics of the electrohydraulic system change, the performance of the electrohydraulic system may fail to correspond to the expectations of the operator. In some instances, the operator may be unable to achieve the performance level desired.

Accordingly, it is an object of this invention to provide an apparatus and method that calibrates an electrohydraulic system such that the performance of the electrohydraulic system is consistent so as to conform to the expectations of the operator.

The present invention is directed to overcoming one or more of the problems as set forth above.

DISCLOSURE OF THE INVENTION

In one aspect of the present invention, an apparatus and method for calibrating an electrohydraulic system is disclosed. In accordance with the present invention, a hydraulic valve that is responsive to an electrical valve signal controllably provides hydraulic fluid flow to a hydraulic actuator. A position sensor senses the position of the hydraulic actuator and responsively produces an actuator position signal. A microprocessor based controller receives the actuator position signal and determines when the hydraulic actuator begins movement, and associates the magnitude of the electrical valve signal to a first predetermined joystick position. Thereafter, the microprocessor based controller determines when the hydraulic actuator movement reaches terminal velocity and associates the magnitude of the electrical valve signal to a second predetermined joystick position.

BRIEF DESCRIPTION OF THE DRAWINGS

For a better understanding of the present invention, reference may be made to the accompanying drawings in which.

BEST MODE FOR CARRYING OUT THE INVENTION

Figure 1:
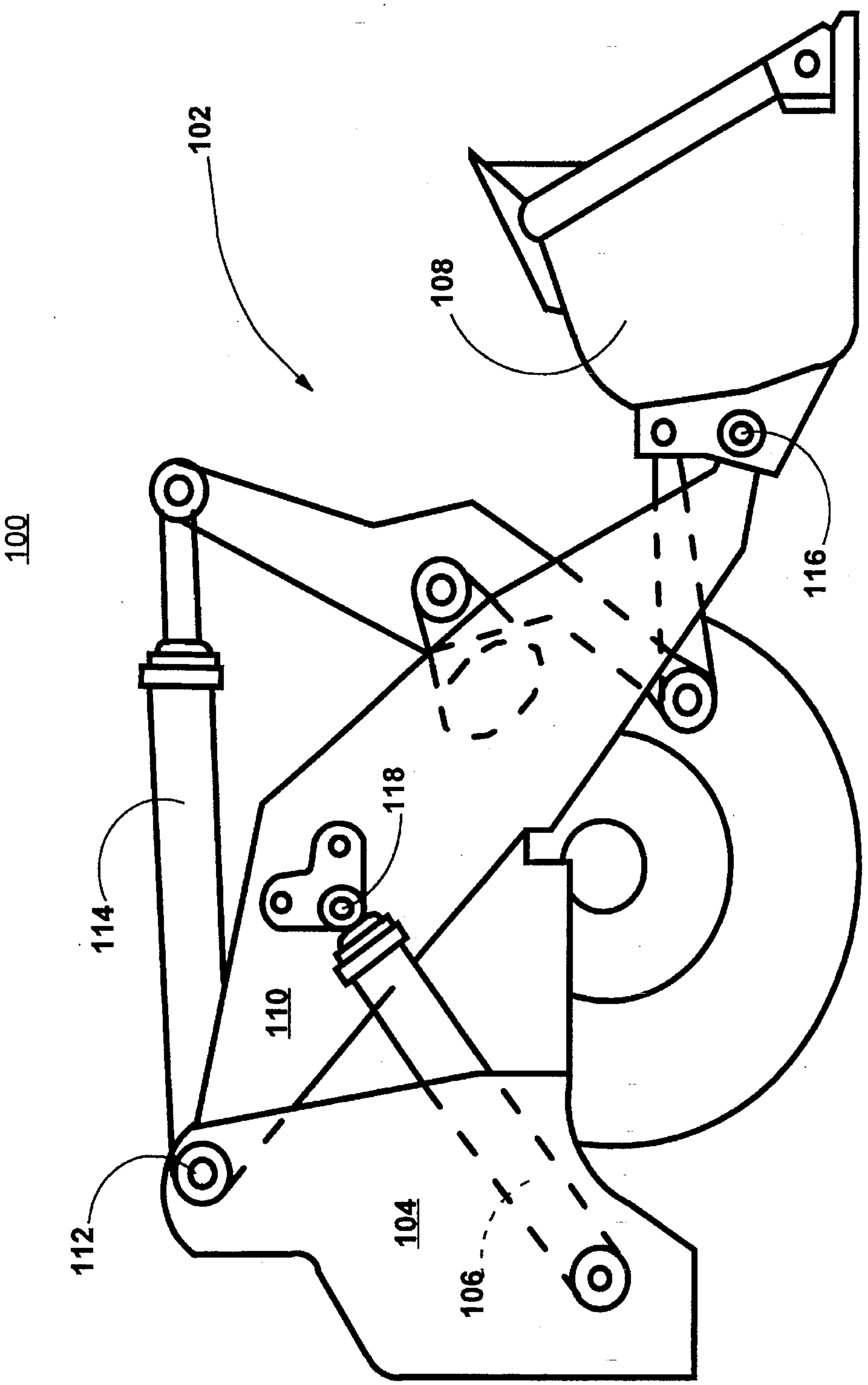
FIG. 1 is a side view of the forward portion of a loader machine or wheel type loader.

The present invention is directed toward a calibration method and apparatus 100 for an electrohydraulic system. For example, with reference to FIG. 1, the present invention is applicable to calibrate an electrohydraulic system that controllably moves a work implement 102 of a wheel type loader machine having a payload carrier in the form of a bucket 108. The bucket 108 is connected to a lift arm assembly 110, which is pivotally actuated by two hydraulic lift cylinders or actuators 106 (only one of which is shown) about a pair of lift arm pivot pins 112 (only one of which is shown) that are attached to the machine frame. A pair of lift arm load bearing pivot pins 118 (only one shown) are attached to the lift arm assembly 110 and the lift cylinders 106. The bucket 108 is tilted by a bucket tilt cylinder 114 about a tilt pivot pin 116. Although the present invention is discussed in relation to a wheel type loader machine 104, the present invention is equally applicable to any type of machine that has an electrohydraulic system.

Figure 2:
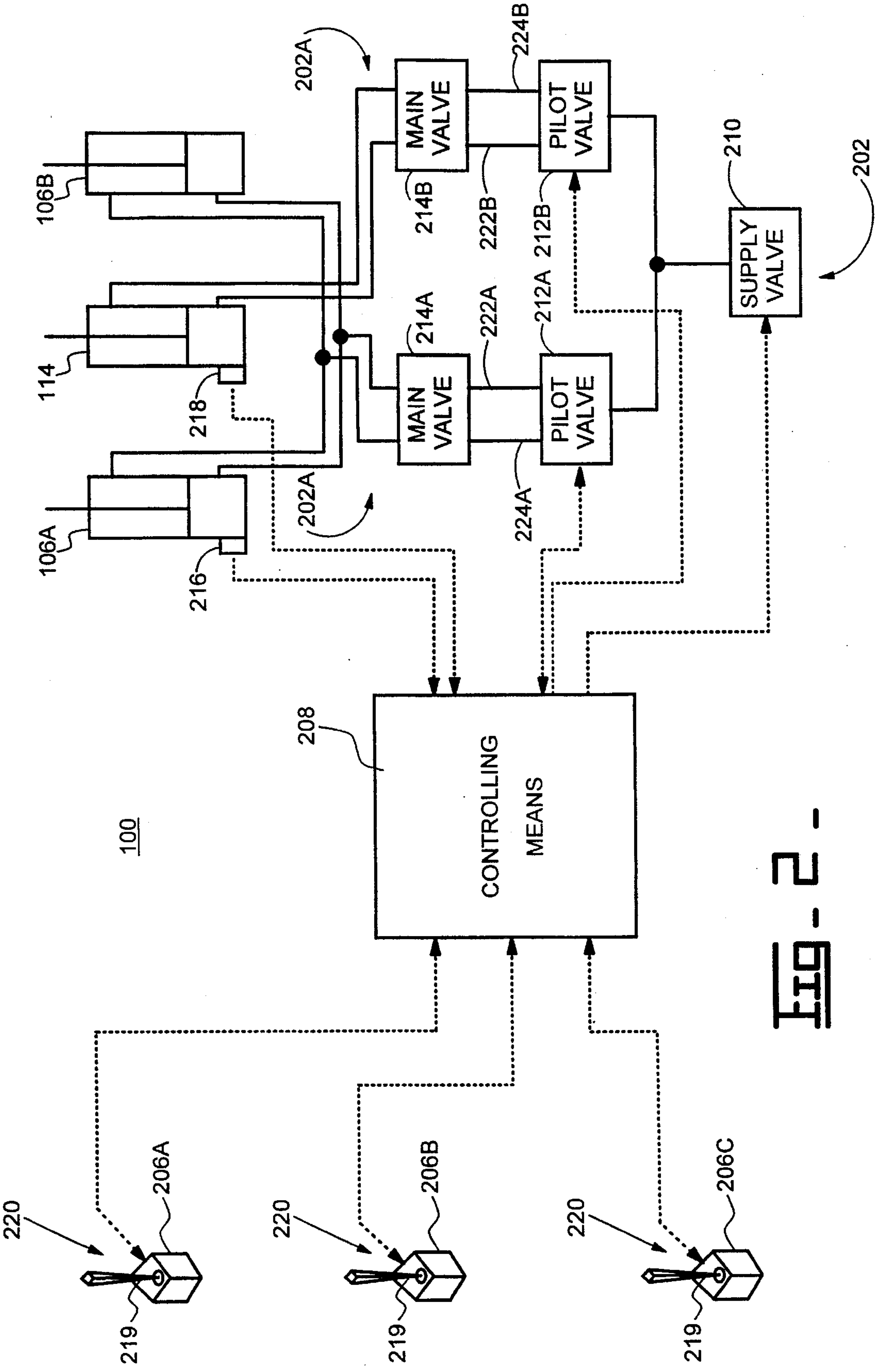
FIG. 2 is a block diagram of an electrohydraulic control system of the loader machine.

With reference to FIG. 2, the calibration system 100 as applied to a wheel type loader is diagrammatically illustrated. The calibration system is adapted to sense a plurality of inputs and responsively produce output signals which are delivered to various actuators in the control system. Preferably, the calibration system includes a microprocessor based controlling means 208.

First, second, and third joysticks 206A, 206B, 206C provide operator control over the work implement 104. The joysticks include a control lever 219 that has movement along a single axis. However, in addition to movement along a first axis (horizontal), the control lever 219 may also move along a second axis which is perpendicular to the horizontal axis. The first joystick 206A controls the lifting operation of the lift arm assembly 110. The second joystick 206B controls the tilting operation of the bucket 108. The third joystick 206C controls an auxiliary function, such as operation of a special work tool.

A joystick position sensing means 220 senses the position of the joystick control lever 219 and responsively generates an electrical joystick position signal. The electrical signal is delivered to an input of the controlling means 208. The joystick position sensing means 220 preferably includes a rotary potentiometer which produces a pulse width modulated signal in response to the pivotal position of the control lever; however, any sensor that is capable of producing an electrical signal in response to the pivotal position of the control lever would be operable with the instant invention.

An implement or hydraulic actuator position sensing means 216, 218 senses the position of the work implement 102 with respect to the work machine 104 and responsively produces an implement position signal. In the preferred embodiment, the position sensing means 216, 218 includes a lift position sensing means 216 for sensing the position of the lift arm assembly 110 and a tilt position sensing means 218 for sensing the position of the bucket 108.

In one embodiment, the lift and tilt position sensing means 216, 218 include rotary potentiometers. The rotary potentiometers are adapted to produce pulse width modulated signals in response to the angular position of the lift arms with respect to the vehicle and the bucket 108 with respect to the lift arm assembly 110. Since the angular position of the lift arms is a function of lift cylinder extension, the signal produced by the rotary potentiometer in the lift position sensing means 216 is a function of lift cylinder extension of hydraulic actuators or cylinders 106A, B. Similarly, since the angular position of the bucket 108 is a function of tilt cylinder extension, the signal produced by the rotary potentiometer in the tilt position sensing means 218 is a function of tilt cylinder extension of hydraulic actuator or cylinder 114. The functions of the sensing means 216, 218 can readily be any other sensor which are capable of measuring, either directly or indirectly, the relative extension of a hydraulic cylinder. For example, the potentiometers could be replaced with radio frequency (RF) sensors disposed within the hydraulic cylinders.

A valve means 202, responsive to electrical valve signals, controllably provides hydraulic fluid flow to the hydraulic actuators or cylinders 106A, B, 114. The lift arm assembly 110 includes left and right lift hydraulic cylinders 106A, B and a tilt hydraulic cylinder 114.

In the preferred embodiment, the valve means 202 includes an electrohydraulic pilot supply valve 210. The electrohydraulic pilot supply valve 210 is electrically connected to the controlling means 208 and adapted to receive electrical output signals from the controlling means 208. The electrohydraulic pilot supply valve 210 is hydraulically coupled to a pilot supply source (not shown) and the rest of the valve means 202. The pilot supply valve 210 is preferably a normally closed on/off pilot valve and is included to control pilot fluid flow. The controlling means 208 is adapted to normally maintain the pilot supply valve 210 in an energized or open state in which pressurized fluid is directed to the rest of the valve means 202. The controlling means 208 is further adapted to de-energize or close the pilot supply valve 210 in response to preselected fault conditions, thereby stopping the flow of pilot fluid flow.

A first portion 202A of the valve control means 202 controls operation of the left and right lift cylinders 106A, B. A second portion 202B of the valve control means 202 control operation of the tilt hydraulic cylinder 114. The first and second portions 202A, 202B are substantially identical, and thus, only the first (lift) portion will be discussed. The second (tilt) portion operates in a similar manner. A third portion (not shown) controls operation of the auxiliary function.

The first portion 202A of the valve means 202 includes an electrically actuated pilot valve 212A connected to a pilot supply source (not shown) via the pilot supply valve 210. A main control valve 214A couples the electrically actuated pilot valve 212A to the hydraulic actuators 106A, B.

Preferably, the electrically actuated pilot valve 212A is of the proportional type as are common in the art. The electrically actuated pilot valve 212A is continuously variable between fully opened at which the resulting electrohydraulic pilot pressure directed toward the main control valves is at maximum pilot pressure and a closed position at which the pilot pressure is substantially zero. The degree the electrically actuated pilot valve 212A is opened is dependent upon the magnitude of the electrical signal received from the controlling means 208. The pilot pressure from the pilot control valve 212A is directed to the main control valve 214A. The pilot pressure valve 212A is coupled to a raise input port 222A and a lower input port 224A of the main control valve 214A. The pilot pressure valve 212A is adapted to direct pilot pressure to one of the input ports 222A, 224A dependent upon the signals from the controlling means 208.

The main control valve 214A is further hydraulically coupled to a hydraulic pump (not shown) for receiving a supply pressure therefrom. The main valve 214A has raise and lower output ports, respectively connected to the head and rod ends of the lift cylinders 106A, B. The main valve 214A operates on the supply pressure to controllably direct pressurized fluid to the head end and rod end of the lift cylinders 106A, B.

Similarly, the second (tilt) portion of the valve means 202, includes a second pilot pressure valve 212B under control of the controlling means 208. A second main control valve 214B is coupled between the second pilot pressure valve 212B and the tilt cylinder 114. The second pilot pressure valve 212B directs pilot pressure to either a first input port 222B or a second input port 224B of the second main control valve 214B. The second main control valve 214B is further hydraulically coupled to a hydraulic pump (not shown) for receiving a supply pressure therefrom. The second main valve 214B has raise and lower output ports, respectively connected to the head and rod ends of the tilt cylinder 114. The second main valve 214B operates on the supply pressure to controllably direct pressurized fluid to the head end and rod end of the tilt cylinder 114.

Although proportional pilot valves are discussed, the proportional pilot valves may equally be replaced by HYDRAC valves. An exemplary HYDRAC valve is disclosed in U.S. Pat. No. 5,366,202 issued on Nov. 22, 1994 to Stephen V. Lunzman, which is hereby incorporated by reference.

Figure 3:
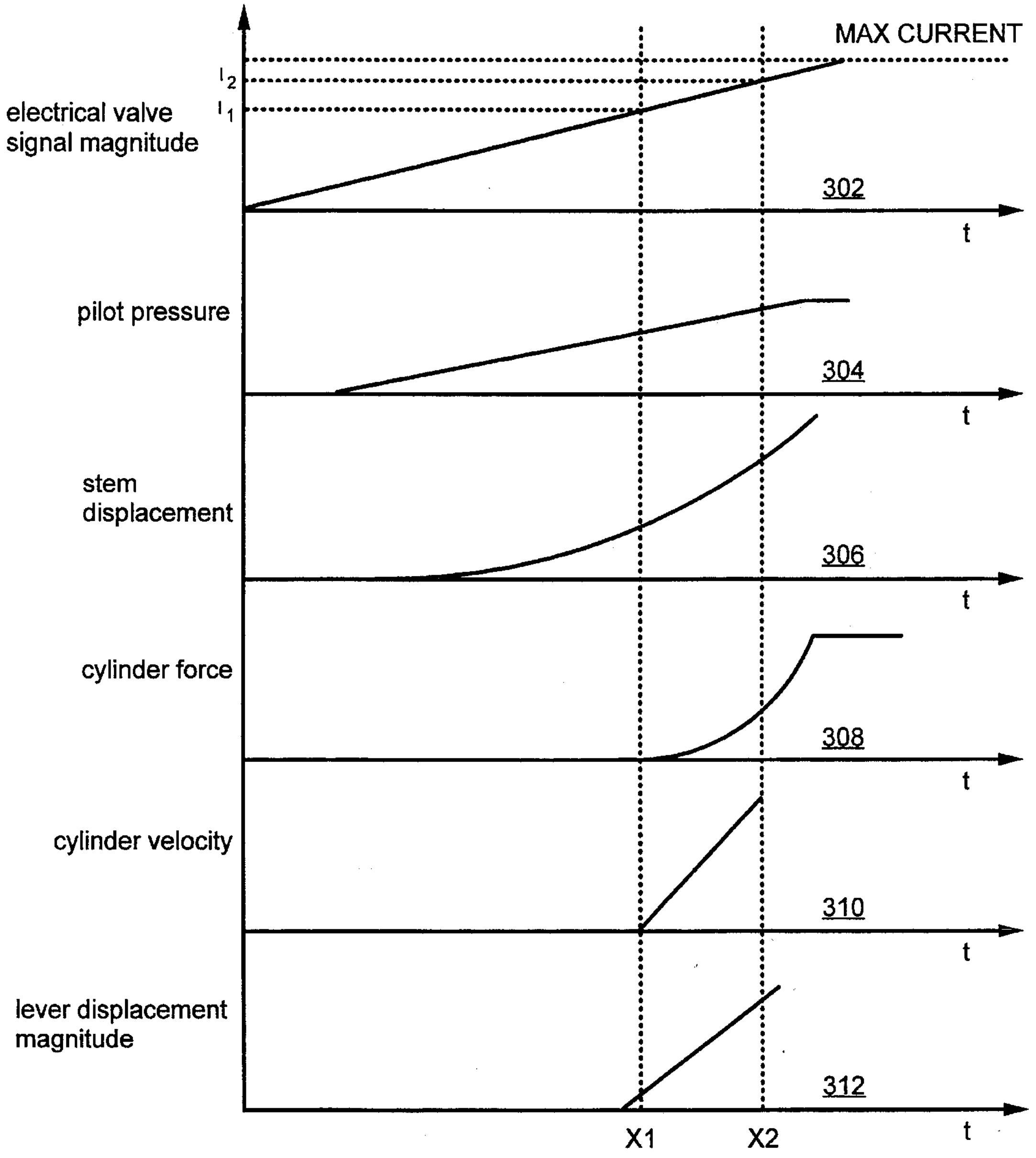
FIG. 3 is a graph illustrating various characteristics of the electrohydraulic system.

The present invention provides-an apparatus and method that calibrates two operating points of the electrohydraulic system to two positions of a control lever. This provides for consistency between the displacement of the control lever and the operation of the electrohydraulic system. With reference to the graph on FIG. 3, the present invention will be described.

The valve calibration is preferably performed with the engine running near high idle and the bucket being empty. At 302, an electrical valve signal having a linear current command is delivered to a pilot valve. The pilot valve produces a pilot pressure or force, represented by 304. The pilot pressure causes the corresponding main valve stem to displace, represented by 306. The displaced stem produces a hydraulic pressure or force, represented by 308. The hydraulic pressure causes the corresponding hydraulic actuator(s) or cylinder(s) to move. The velocity of the cylinder movement is represented by 310.

The present invention determines two operating points that is associated with the movement of a hydraulic cylinder. The first operating point is defined as the electrical valve signal magnitude that initiates hydraulic cylinder movement. The second operating point is defined as the electrical valve signal magnitude that causes the hydraulic cylinder movement to reach terminal velocity.

To determine the cylinder velocity, the controlling means 308 receives the actuator position signal, and responsively determines an actual cylinder velocity and an average cylinder velocity in a well known manner. To determine terminal velocity, the controlling means 308 compares the actual velocity to the average velocity, and when the difference between the actual and the average velocity is less than a predetermined amount, terminal velocity is said to have occurred, e.g., where the difference between the actual and the average velocity is less then 10%.

When the cylinder initiates movement, the electrical valve signal magnitude is recorded—this is operating point one. Likewise, when the cylinder movement reaches terminal velocity, the electrical valve signal magnitude is again recorded—this is operating point two. The two operating points, i.e., the two electrical valve signal magnitudes, are mapped in a look-up table against two predetermined joystick or control lever positions X1, X2. In other words, the two predetermined control lever positions X1, X2 are translated into control currents I1, I2. For example, X1 represents a 4° deflection of the control lever (about 13% of lever travel) and X2 represents a 26.6° deflection of the control lever (about 95% of lever travel). Thus, after calibration, when the control lever is displaced 4°, cylinder movement should begin (at high idle and with an empty bucket). Similarly, when the lever is displaced 26.6°, cylinder movement should reach terminal velocity (at high idle and with an empty bucket).

The two operating points are used to construct a basic valve curve that represents the electrohydraulic characteristics of a particular machine. Interpolation may then be performed to determine the electrical valve signal magnitude at control lever positions between X1 and X2. Advantageously, calibration of the electrohydraulic characteristics leads to consistent performance from machine to machine.

Thus, while the present invention has been particularly shown and described with reference to the preferred embodiment above, it will be understood by those skilled in the art that various additional embodiments may be contemplated without departing from the spirit and scope of the present invention.

Industrial Applicability

Machines such as wheel type loaders include work implements capable of being moved through a number of positions during a work cycle. The typical work cycle associated with a bucket includes positioning the bucket and associated lift arm assembly in a digging position for filling the bucket with material, a carrying position, a raised position, and a dumping position for removing material from the bucket.

An electrohydraulic system provides motion to the work implement so that a work cycle, can be carried out. To provide consistent performance of the electrohydraulic system, the present invention provides a method and apparatus for calibrating the electrohydraulic system. The calibration method is preferably performed first when the machine is manufactured, then at various times throughout the life of the machine to insure that the electrohydraulic system performs consistently—even when the electrohydraulic components wear. Therefore, the electrohydraulic system will able to correspond to the expectations of the operator. Note that, although the present invention has been discussed in relation to wheel type loader machines, it will be understood to those skilled in the art that the present invention is applicable to any type of machine that has an electrohydraulic system.

Other aspects, objects and advantages of the present invention can be obtained from a study of the drawings, the disclosure and the appended claims.

We claim:

1. An apparatus for calibrating an electrohydraulic system including a hydraulic actuator, comprising:

a joystick;

valve means, responsive to an electrical valve signal, for controllably providing hydraulic fluid flow to the hydraulic actuator in response to a magnitude of the electrical valve signal;

position sensing means for sensing a position of the hydraulic actuator and responsively producing an actuator position signal;

controlling means for receiving the actuator position signal, determining when the hydraulic actuator begins movement, and associating the magnitude of the electrical valve signal to a first predetermined joystick position; and thereafter, determining when the hydraulic actuator movement reaches a terminal velocity, and associating the magnitude of the electrical valve signal to a second predetermined joystick position.

2. An apparatus, as set forth in claim 1, including a joystick position sensing means for sensing the position of the joystick and responsively generating a joystick position signal.

3. An apparatus, as set forth in claim 2, wherein the controlling means receives the joystick position signal, responsively determines a desired electrical valve signal magnitude associated with the electrical valve signal in response to the joystick being positioned at or between the first and second predetermined positions, and delivers an electrical valve signal to the pilot valve to provide hydraulic fluid flow to the hydraulic actuator in response to the desired magnitude of the electrical valve signal.

4. An apparatus, as set forth in claim 3, wherein the valve means includes a proportional valve electrically coupled to the controlling means and a main valve hydraulically coupled between the proportional valve and the hydraulic actuator.

5. An apparatus, as set forth in claim 3, wherein the valve means includes a hydrac valve electrically coupled to the controlling means and a main valve hydraulically coupled between the hydrac valve and the hydraulic actuator.

6. A method for calibrating an electrohydraulic system including a pilot valve, a main valve; a hydraulic actuator and a joystick, comprising:

delivering an electrical valve signal to the pilot valve for controllably providing hydraulic fluid flow to the hydraulic actuator in response to a magnitude of the electrical valve signal;

sensing a position of the hydraulic actuator and responsively producing an actuator position signal;

receiving the actuator position signal, determining when the hydraulic actuator begins movement, and associating the magnitude of the electrical valve signal to a first predetermined joystick position; and thereafter, determining when the hydraulic actuator movement reaches a terminal velocity, and associating the magnitude of the electrical valve signal to a second predetermined joystick position.

7. A method, as set forth in claim 6, the steps of associating the electrical valve signal magnitudes in a look-up table with the predetermined joystick positions.

8. A method, as set forth in claim 7, wherein the step of determining the terminal velocity includes the steps of:

receiving the actuator position signal, and responsively determining an actual and average velocity of the actuator movement;

comparing the actual velocity to the average velocity, and determining the terminal velocity in response to the difference between the actual and the average velocity being less than a predetermined amount.

9. A method, as set forth in claim 8, including the steps of:

sensing the position of the joystick and responsively generating a joystick position signal;

receiving the joystick position signal, and responsively determining a desired electrical valve signal magnitude associated with the electrical valve signal; and delivering an electrical valve signal to the pilot valve to provide hydraulic fluid flow to the hydraulic actuator in response to the desired magnitude of the electrical valve signal.

10. A method, as set forth in claim 9, wherein the step of determining a desired magnitude of the electrical valve signal includes the steps of selecting a mapped electrical valve signal magnitude from the look-up table in response to the joystick being positioned at the first or second predetermined position.

11. A method, as set forth in claim 10, wherein the step of determining a desired magnitude includes the steps of interpolating between mapped electrical valve signal magnitudes from the look-up table in response to the joystick being positioned between the first and second predetermined positions.

* * * * *

UNITED STATES PATENT AND TRADEMARK OFFICE

CERTIFICATE OF CORRECTION

PATENT NO. : 5,623,093

DATED : April 22, 1997

INVENTOR(S) : Nathan T. Schenkel et al.

It is certified that error appears in the above-identified patent and that said Letters Patent is hereby corrected as shown below: Column 6, line 65:

Please insert --including-- in claim 7.

Please correct claim 7 to read as follows:

A method, as set forth in claim 6, including the steps of associating the electrical valve signal magnitudes in a look-up table with the predetermined joystick positions.

Signed and Sealed this

Fifth Day of August, 1997

Attest:

Bruce Lehman

BRUCE LEHMAN

Attesting Officer

*Commissioner of Patents and Trademarks*